United States Patent [19]
Herisson

[11] Patent Number: 4,481,343
[45] Date of Patent: Nov. 6, 1984

[54] PROCESS FOR THE POLYMERIZATION OF TETRAFLUOROETHYLENE IN AQUEOUS DISPERSION

[75] Inventor: Jean-Louis Herisson, Brignais, France

[73] Assignee: Produits Chimiques Ugine Kuhlmann, Courbevoie, France

[21] Appl. No.: 205,993

[22] Filed: Nov. 12, 1980

[30] Foreign Application Priority Data

Dec. 21, 1979 [FR] France ................... 79 31395

[51] Int. Cl.³ ............................................ C08F 114/26
[52] U.S. Cl. .................................... 526/255; 524/546
[58] Field of Search ........................................ 526/255

[56] References Cited
U.S. PATENT DOCUMENTS 3,345,317 10/1967 Hoashi ............................... 526/255
3,535,301 10/1970 Groppelli et al. ................... 526/255

Primary Examiner—Harry Wong, Jr.
Attorney, Agent, or Firm—Sigalos & Levine

[57] ABSTRACT

The process for the polymerization in aqueous dispersion of tetrafluoroethylene in the presence of an emulsifier and an initiator, with the latter yielding free radicals between 0° and 45° C. and being destroyed for a temperature above 45° C., characterized by the fact that the temperature of the reaction medium as a function of polymerization time is made to follow an ascending curve, Temperature °C. versus t (time in minutes) whose slope ($\Delta T/\Delta t$) cannot be less than 1/6, $\Delta T$ representing the temperature in °C. at a given time in minutes $\Delta t$, with this ascending curve being situated inside of a sector limited by two straight lines $y=(7/12)x$ and $y=(15/7)x+45$, in which y and x respectively represent the temperature in °C. and the time expressed in minutes, and by the fact that the initiator is destroyed before the concentration of polytetrafluoroethylene in the dispersion has reached 20%.

8 Claims, 1 Drawing Figure

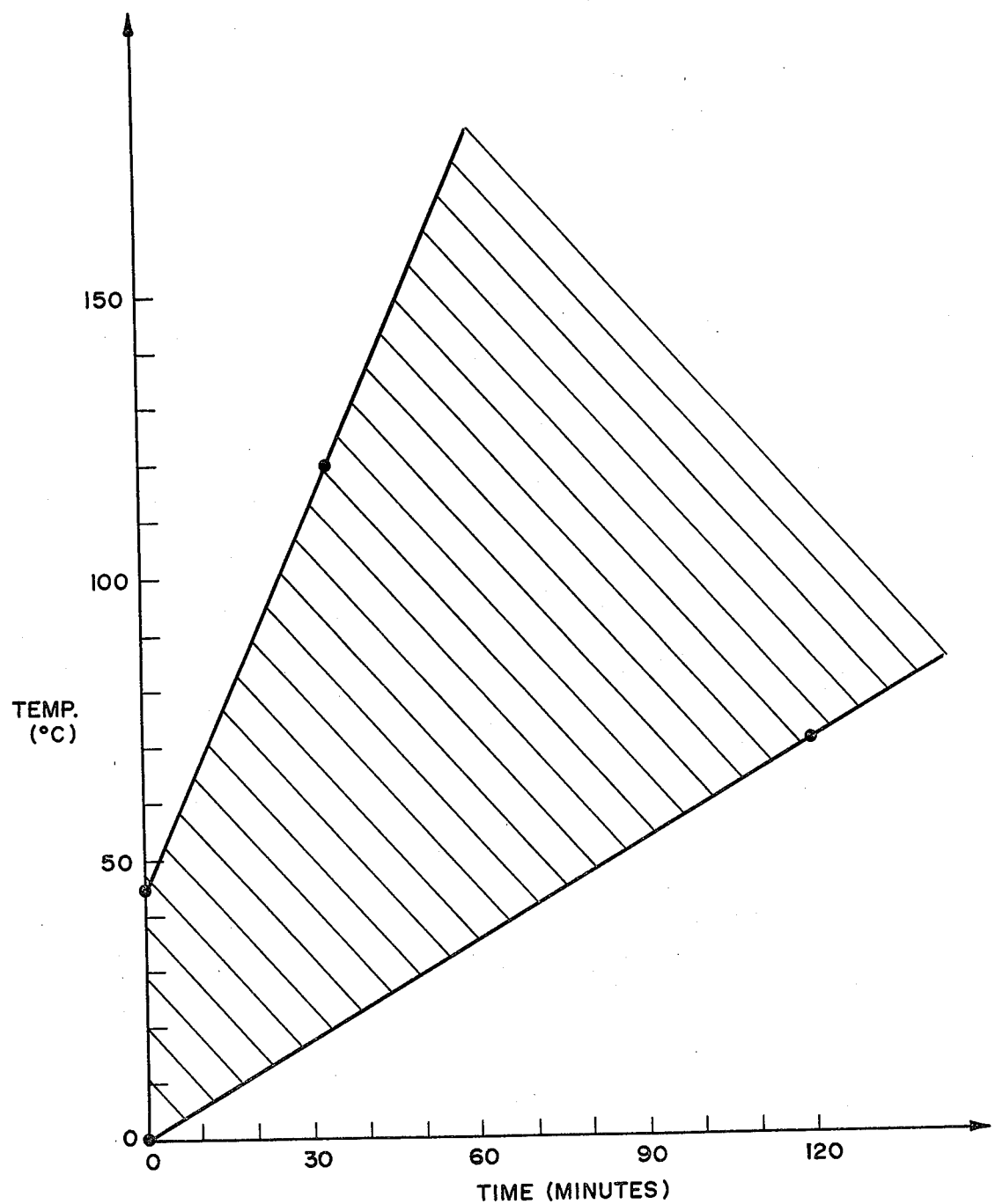

PROCESS FOR THE POLYMERIZATION OF TETRAFLUOROETHYLENE IN AQUEOUS DISPERSION

BACKGROUND OF THE INVENTION

The polymerization of tetrafluoroethylene, hereinafter called "TFE", in aqueous emulsion is a known technique which makes it possible to obtain dispersions of polytetrafluoroethylene (PTFE) in water which have found numerous industrial applications; in particular, the coating of metals or other substrates, the impregnation of fibers and fabrics, the preparation of films and varnishes, and the production by coagulation of powders for lubricated extrusion.

In the processes which are presently known, the PTFE dispersions are prepared at constant temperature by placing in contact with each other, in a pressure-resistant autoclave, the gaseous monomer, or a mixture of monomers in the case of the preparation of copolymers, and an aqueous solution kept at the constant polymerization temperature and containing an initiator capable of forming free radicals at the polymerization temperature, possibly a buffer in order to keep the medium at a given pH, and an emulsifier which generally is an alkaline or ammonium salt of a carboxylic or sulfonic acid whose carbon chain carries only fluorine atoms and possibly chlorine atoms. Under these conditions, the dispersions obtained are not very stable and it is hardly possible to exceed a PTFE concentration of 25 to 30% by weight.

The fact of not being able to exceed degrees of conversion corresponding to 25 to 30% by weight of final PTFE concentration results in obtaining products whose molecular weights are too low. In fact, it is above all at the end of polymerization, that is to say at high conversion degrees, that the molecules of highest molecular weight are being formed. Consequently, everything else being equal, the higher the final concentrations which are achieved, the higher the mean molecular weight of the powder and the better its properties on application.

Among the different possibilities for increasing the molecular weight on polymerization, there are those possibilities which permit this improvement without an increase in the degree of conversion and then there are those possibilities which, while permitting an increase in the degree of conversion, at the same time bring about an increase in the molecular weight. These latter possibilities are the most interesting ones, since they improve the productivity of the material.

An increase in the molecular weight can, for instance, be achieved by diminishing the quantity of initiators used, but this presents the drawback of slowing the polymerization and, consequently, of increasing the time during which the dispersion is subjected to agitation and, thus, of obtaining less stable dispersions or still lower PTFE concentrations. The reaction rate can, for instance, also be increased, either by increasing the monomer pressure, but technological problems and problems of material costs are encountered very soon; or by increasing agitation, but there again is the risk of further destabilizing the dispersion; or by increasing the quantity of initiators, which has the effect of annulling the gain contributed by the increase in the reaction rate.

An increase in the molecular weights can be achieved, without changing the quantities of initiators, by an improvement of the conversion into PTFE, that is to say by increasing the final concentration of the dispersions.

A considerable improvement in the results was obtained according to French Pat. No. 1,019,304 by adding to the polymerization medium, as a stabilizer, from 0.1 to 12% by weight of the aqueous dispersion of a saturated hydrocarbon containing more than 12 carbon atoms and being liquid under the conditions of the polymerization. This process presents several drawbacks. It makes cleaning of the polymerization autoclave difficult, and this results in a loss of time which is not very compatible with industrial production, especially when a paraffin hydrocarbon which is solid at ambient temperature is used. Moreover, if the hydrocarbon used is liquid, its total elimination from the dispersion requires rather lengthy settling and decantations which in practice lead to the loss of a significant quantity of PTFE. Finally, if the elimination of the hydrocarbon is not perfect, residual traces of this product contaminate the finished product. In addition, the saturated hydrocarbons commonly employed are often more or less pure mixtures which can change with time and thus cause a polymerization irregularity and, above all, mixtures which possess a slight transfer of activity which increases with increasing temperature and prevents products of high molecular weight from being obtained.

Another improvement proposed by Belgian Pat. No. 678,637 consists in using a halogenated paraffin hydrocarbon having from 1 to 3 carbon atoms; in particular, 1,1,2-trifluoro-1,2,2 trichloroethane, as the stabilizer. However, the use of this process is limited by the obligation of working at polymerization temperatures between 5° C. and 30° C. and by the necessity of using large quantities of chlorofluorinated hydrocarbon, from 50 to 500 g per liter of aqueous dispersion, and this requires a recovery of the stabilizer by decantation of the dispersion and in practice entails a loss of stabilizer.

Another improvement proposed by French Pat. No. 2,123,703 consists in using as the stabilizer extremely low quantities of cyclic or acyclic halogenated saturated hydrocarbons having less than 20 carbon atoms and being non-copolymerizable with TFE, or mixtures of these products. Concentrated dispersions of PTFE exhibiting a very great purity and an excellent stability are obtained, but it is not possible to obtain products of high molecular weight, since the additives have a high chain transfer activity.

British Pat. No. 1,545,675 proposes a polymerization carried out in part at a temperature being kept constant and in part at another temperature. The goal sought after then is an increase of the amorphism index for the polymer formed in the second part of the polymerization. According to the graph attached to this patent, if the first part of the polymerization is carried out at 70° C. or more, the second part must be done at a higher temperature; but if the first part is done at a lower temperature, then the second part must be done at an even lower temperature. Furthermore, this polymerization uses paraffin wax as the stabilizer and the final concentration does not exceed 25% by weight.

SUMMARY OF THE INVENTION

Although the fact of not polymerizing at a constant temperature is considered to be unfavorable, particularly for reasons of reproducibility and of lack of obtaining a high final concentration, the process for the preparation of aqueous dispersions of PTFE according to the present invention consists of a polymerization, at increasing temperature, of the TFE dissolved in an aqueous medium containing the initiator, the appropriate emulsifier, possibly a buffering agent, and not containing any other stabilizer, and nevertheless making it possible to obtain, in the polymerization autoclave, dispersions of PTFE having a concentration as high as 40-50% by weight and being stable mechanically. This type of polymerization, furthermore, makes it possible to obtain a PTFE of very high molecular weight. This type of polymerization likewise presents an economic advantage, since the elimination of the use of stabilizers other than the emulsifier permits savings of material as well as labor savings because of an easier cleaning operation of the reactors.

The present invention comprises the process of polymerizing TFE in aqueous dispersion in the presence of an emulsifier and an initiator, with the latter yielding free radicals between approximately 0° C. and 45° C. and being destroyed for a temperature above 45° C.; the temperature of the reaction medium as a function of polymerization time being regulated so as to follow an ascending curve, Temperature T°C. versus t (time in minutes), whose slope ($\Delta T/\Delta t$) cannot be less than (1/6), $\Delta T$ representing the temperature in °C. at a given time in minutes $\Delta t$, with this ascending curve being situated inside of a sector limited by two straight lines $y=(7/12)x$ and $y=(15/7)x+45$, in which y and x, respectively, represent the temperature in °C. and the time expressed in minutes.

For economic and/or technological reasons, it is recommended to also limit the sector by two other straight lines $y=120$ and $x=120$. In fact, it is not economical to make the polymerization last beyond 2 hours for concentrations of 40-45%. It is difficult for an equipment set-up to exceed a temperature of 120° C. when polymerization is being carried out in an aqueous medium, and furthermore, it is difficult to exceed $\Delta T/\Delta t$ values of (24/7) for reasons of thermal expansion, thermal shocks and heat evacuation from the reactor to maintain the necessary ascending curve.

DESCRIPTION OF THE DRAWING

The single FIGURE of the drawing illustrates the time/temperature relationships more fully described in the specification.

DETAILED DESCRIPTION

The instant process makes it possible to obtain dispersions having high PTFE concentrations which are stable in the polymerization reactor and do not require the addition of a stabilizer (other than an emulsifier) and specifically, do not require the addition of paraffin, liquid paraffins, fluorinated solvents, chlorinated solvents, or hydrogenated solvents. The resultant products are fine powders of PTFE of high molecular weights and, consequently, possessing better mechanical properties, particularly, elongation/tensile strength.

It is noted that the ascending curve usually corresponds to essentially a linear straight line over the major part of the duration of polymerization. Except in the possible cases during the first few minutes when the polymerization starts up on a plateau of essentially even temperature, it can be estimated that the ascending curve is practically a linear straight line for at least ⅔ of the duration of the polymerization. In practice, this linearity is found within the limits, on one hand, of about 30 g of PTFE formed per initial liter of water when the polymerization starts up without a temperature plateau and at most 200 g/l for a maximum temperature plateau time of polymerization initiation and, on the other hand, of at least 500 g/l for the end of polymerization. When the polymerization is started up on a temperature plateau, the latter generally does not exceed 15 minutes.

The term "essentially linear straight line" means an accuracy for the theoretical straight line, Temperature °C. versus t (time in minutes), such that for any point $T_iC.°$ the real value of the corresponding polymerization time $t_i$ is expressed to $\pm 10$ minutes and such that for any point $t_i$ the corresponding real temperature $T_iC.°$ is expressed to $\pm 5°$ C.

From the preceding data it is evident that the initial polymerization temperature can be between 0° and 45° C., with the final temperature being between 70° C. and 120° C.

Outside of the conditions stated above, the dispersion polymerizations according to the invention are carried out according to known procedures.

The polymerization is started up by free radicals originating in the most usual manner from the decomposition of an initiator such as a hydrosoluble peroxide, like succinyl peroxide, or of an alkaline persulfate or ammonium persulfate making it possible to obtain free radicals between 0° C. and 45° C., and, preferably, between 10° C. and 45° C. The initiator can be used in association with an activator such as ferrous salt, silver nitrate, sodium bisulfite. In this type of polymerization according to the invention, raising the temperature of the polymerization reaction above the activity zone of the initiator system, which is situated at the most at about 45° C., results in its destruction; the polymerization is carried out solely by the free radicals of the growing chains. Customarily, the initiator is destroyed before the concentration of the dispersion of PTFE having been formed has reached about 20%. The pH can be kept alkaline by a buffer such as phosphate, pyrophosphate, alkaline borate or aluminum borate.

The emulsifiers used are those which are known in this type of polymerization. Most often they are fluorinated or chlorofluorinated salts, in particular sodium, ammonium, lithium or potassium salts of a perfluoromonocarboxylic acid or perfluoromonosulfonic acid having 6 to 11 carbon atoms, such as ammonium perfluoroctanoate. They are introduced in aqueous solution, either totally at the start of polymerization or progressively during the course of polymerization as described in French Pat. No. 1,550,055.

The polymerization pressure is generally between one and one hundred bars and preferably between 10 and 30 bars.

In order to render the examples set forth below to further illustrate the invention more explicitly, the following preliminary particulars are given.

The concentration of the PTFE dispersions is measured on the dry extract and is expressed as % of PTFE by weight based on the final dispersion.

The mechanical stability of the dispersions according to the invention can be determined by agitating the dispersions having previously been diluted to 10% of PTFE, at ambient temperature, by means of an agitator with four blades in a cylindrical container equipped with four counter-blades, analogous to the apparatus described by J. F. Lontz in Industrial and Engineering Chemistry, 1952, volume 44, page 1805.

The total duration of agitation at predetermined speeds necessary in order to obtain coagulation makes it possible to evaluate the stability of the dispersion based on the following arbitrary scale:

| Duration of agitation | Stability |
|---|---|
| 0 to 5 min. at 250 RPM | very low |
| 5 to 15 min. at 250 RPM | low |
| 15 to 30 min. at 250 RPM | average |
| 30 min. at 250 RPM + 0 to 30 min. at 350 RPM | high |
| No coagulation after 30 min. at 250 RPM + 30 min. at 350 RPM + 30 min. at 450 RPM | exceptional |

The molecular weight of the PTFE cannot be determined directly, since the PTFE is not soluble in any solvent. Only indirect measurements permit a comparative evaluation between different PTFE powders. The best known method is the method of measurement of the Standard Specific Gravity (SSG); this ASTM method No. 1457-75 T requires preparing a small plaque having a diameter of 76 mm and sintering it according to a given thermal cycle. On this small plaque, the molecular weight can likewise be evaluated by the shape of the elongation/tensile strength curve obtained on standard test specimens and, more precisely for instance, on the value of the tensile strength for a given elongation, for instance at 300% elongation (TS 300%).

The quality of the PTFE powder obtained by coagulation of the dispersion, water/powder separation and then drying, is monitored, on one hand, by making granulometric and density measurements on the powder and, on the other hand, by proceeding with extrusion tests. This extrusion of the powders obtained is carried out under conditions described in detail below. The powder is mixed with 18% by weight either of E gasoline or of kerosene. After agitation for 30 minutes in a flask on a mixer with rollers, the mixture is conditioned at 25° C. for at least four hours. The lubricated mixture is then poured into a mold and is brought to the preform state by increasing the pressure up to a value of 2.0 MN/m² in 5 minutes. The pressure is then kept at 2.0 MN/m² for another 5 minutes. The preform is then extruded at 30° C. by using a hydraulic extruder having a constant piston speed of 8.0 cm/min. The polymer is extruded through a die having a 10.0 mm diameter and including a central die of 8.0 mm diameter. The reduction ratio, that is to say the ratio between the surface of the cross section of the cylinder enclosing the piston and the surface of the cross section of the die, is approximately 90:1. The pressure required in order to extrude the polymer under these conditions is measured by means of a pressure transducer. At the exit of the extruder, the formed tube (8×10) is dried in continuous manner and heated in continuous manner at temperatures of about 400° C. during time periods of a few minutes. The extrusion can also be carried out through a rectangular die without punch; the rod having been obtained is calendered in order to obtain a ribbon which is subsequently dried, then rolled-up on itself under tension until a roll of a certain thickness is obtained, then heated for several minutes at 380°–400° C. Among the evaluation criteria for the quality of the PTFE powders, there is the final appearance of the tubes (8×10) or of the rolls and, in particular, the coloration. Residues of liquid paraffin or paraffin remaining on the powder, even when very slight, lend a more or less brown coloration to the tube or the roll.

EXAMPLE 1

The trials of this example are given in order to show the effect of an increasing temperature curve on the molecular weights of the PFTE obtained and on the mechanical stability of the dispersion. These polymerizations were voluntarily stopped at similar concentrations in order that the comparison would not be falsified by this parameter. Tests B and C are within the scope of the invention, while Test A corresponds to a polymerization carried out according to prior art at constant temperature.

Into an autoclave made of stainless steel, having a capacity of 40 liters and equipped with a temperature control double jacket and with a rotary agitator provided with a turbine having 4 flat blades turning at 250 RPM, and having carefully been degassed, 20 liters of water, 11 g of ammonium perfluoroctanoate and 6.0 g of sodium pyrophosphate are introduced. With the temperature of the reaction medium being at 15° C., gaseous tetrafluoroethylene is introduced until a pressure of 20 bars is reached and 0.4 g of ammonium persulfate are also introduced. Agitation is started and the tetrafluoroethylene pressure is raised to 22 bars, and 0.6 g of Mohr's salt (ferreous ammonium sulfate) are added. Polymerization starts immediately, resulting in a pressure drop. The pressure is kept between 20 and 22 bars by successive introductions of monomer, while 19 g of ammonium perfluoroctanoate are progressively being introduced. The temperature increases constantly. The evolution of the temperature in these tests and the results obtained are shown in the following Table I.

TABLE I

| Test No. | Temperature of the reaction medium °C. | | | | Polymerization time in minutes | Mechanical stability of the final dispersion in minutes | Final PTFE concentration (% by weight) | TS 300%* (kg/cm²) |
|---|---|---|---|---|---|---|---|---|
| | initial | after 10 min. | after 20 min. | after 30 min. | at the end of polymerization | | | | |
| A | Constant temperature of 17° C. ± 5° C. | | | | 21 | 50 | 15 | 29 | 148 |
| B | 12 | 25 | 39 | 51 | 50 | 33 | 20 | 30 | 162 |
| C | 14 | 30 | 47 | 63 | 65 | 33 | 29 | 27 | 165 |

*Tensile strength at 300% elongation

These tests make it possible to state that at comparable final concentration of the dispersion, the fact of permitting the temperature of the reaction medium to rise as fast as possible permits improving the mechanical stability and the molecular weight of the PTFE powder.

These dispersions are coagulated mechanically, and then the powder is separated from the water and dried at 150° C., until a moisture content of less than 500 ppm is obtained. They are then used to make the tubes and the rolls according to the process described above. The tubes and rolls of trials B and C are white and free of defects.

EXAMPLE 2

Into an autoclave made of stainless steel, of the same type as the one of Example 1, and having been carefully degassed, 20 liters of water 11 g of ammonium perfluoroctanoate and 6 g of sodium pyrophosphate are introduced. With the temperature of the reaction medium being at 15° C., gaseous tetrafluoroethylene is introduced until a pressure of 20 bars is reached and 0.4 g of ammonium persulfate are also introduced. Agitation is started and the tetrafluoroethylene pressure is raised to 22 bars, and then 0.6 of Mohr's salt are added. Polymerization starts immediately, resulting in a pressure drop. The pressure is kept between 20 and 22 bars by successive introductions of monomer, while 69 g of ammonium perfluoroctanoate are progressively being introduced. The temperature increases constantly; it reaches 42° C. after 16 min. for a concentration of the dispersion of about 10% by weight, 57° C. after 30 min. for a concentration of about 25% by weight, 69° C. after 42 min., 78° C. after 52 min., 85° C. after 60 min. and 88° C. after 68 min. At this stage, the concentration amounts to 43% by weight; agitation is stopped, the remaining residual monomer is vented and the autoclave is opened. After emptying, the autoclave is easily cleaned by simply rinsing with water.

The dispersed particles have regular shapes and have a diameter of 0.2 to 0.3$\mu$. The stability of this dispersion is high, but it is nevertheless possible to coagulate it by mechanical agitation in order to obtain a powder for lubricated extrusion.

The specific gravity of the polymer having been obtained, determined according to ASTM Standard No. 1457-75T, amounts to 2.150, denoting a high molecular weight. The molecular weight can be evaluated from the elongation/tensile strength curve, according to ASTM Standard No. 1457-75T. The value of the tensile strength for a given elongation of 300% amounts to 210 kg/cm$^2$.

The finished products in the form of tubes or rolls are white and free of defects.

EXAMPLE 3

Example 2 is repeated, except that the temperature of the reaction medium at the start is 32° C., it reaches 40° C. after 10 min. for a concentration of the dispersion of about 10% by weight, 60° C. after 30 min. for a concentration of 20% by weight, 80° C. after 50 min., 90° C. after 64 min. and 92° C. at the end of polymerization. At the end of polymerization, the concentration amounts to 40.1% by weight. The polymerization is stopped by stopping the agitation and venting of the remaining monomer.

The stability of the dispersion having been obtained is high. The standard specific gravity is 2.15 and on the elongation/tensile strength curve the value of the tensile strength for a given elongation of 300% amounts to 212 kg/cm$^2$; these values denote a product of high molecular weight. The finished products in the form of tubes or rolls are white and free of defects.

EXAMPLE 4

Example 2 is repeated by changing the temperature curve. The initial temperature is 14° C., it reaches 30° C. after 4 min., 50° C. after 13 min. for a concentration of the dispersion of about 18% by weight, 80° C. after 25 min., 100° C. after 36 min., 110° C. after 45 min., 120° C. at the end of the polymerization after 48 min. The final concentration amounts to 42.4% by weight. Agitation is stopped, the remaining monomer is vented and the autoclave is opened. The final dispersion has a high mechanical stability. The standard specific gravity is 2.15 and the tensile strength for a given elongation of 300% amounts to 220 kg/cm$^2$, denoting a product of high molecular weight.

The finished product in the form of tubes or rolls are white and free of defects.

EXAMPLE 5

This example is given by way of comparison in order to show the detrimental effect of a stabilizer of the paraffin or saturated liquid hydrocarbon type on the molecular weight of the PTFE and on the quality of the finished products manufactured from the powder originating from the coagulation of a dispersion polymerized at constant temperature according to prior art.

Test A of Example 1 is repeated by introducing 1 liter of liquid paraffin of the Codex grade of the TOTAL TB-10 brand into the reaction medium at the start of polymerization.

The polymerization must be stopped at the end of 45 minutes, since the dispersion obtained, exhibiting average stability, commences to coagulate when the concentration of the dispersion reaches only 32% of polytetrafluoroethylene. The mechanical stability of the dispersion is low (7 min.). The standard specific gravity amounts to 2.18 and the tensile strength for a given elongation of 300% amounts to 150 kg/cm$^2$ denoting a product of clearly lower molecular weight than that of the products of Example 2, 3 and 4.

The dispersion collected is allowed to settle for 48 hours, then the bottom is drawn off, and the upper layer is left. This upper layer essentially consists of liquid paraffin and a small quantity of PTFE in part in the form of a flocculate and in part in the form of a dispersion, hence a loss of product. The drawn-off portion is coagulated mechanically, the powder is separated from the water and dried at 150° C. until a moisture content below 500 ppm is obtained. The finished products in the form of tubes or rolls are slightly brown colored, above all in the mass.

EXAMPLE 6

This example is given for the sake of comparison. Test A of Example 1 is repeated with the exceptions that a quantity of 69 g of ammonium perfluoroctanoate is introduced during the course of polymerization and 1 liter of liquid paraffin of the grade CODEX SIDEPALINE 2 X is added at the start, and that the temperature of the reaction medium is kept constant at 20° C.±5° C. during the polymerization. The polymerization is stopped at a PTFE concentration of 37% by weight. The dispersion obtained has an average mechanical stability (20 min.).

The specific gravity of the polymer is 2.17 and the tensile strength for a given elongation of 300% is 170 kg/cm$^2$. The finished products in the form of tubes or rolls are brown colored.

EXAMPLE 7

Example 2 is repeated, but only 3 g of sodium pyrophosphate, 0.2 g of ammonium persulfate and 0.3 of Mohr's salt are used. The initial temperature is 14° C., it reaches 40° C. after 18 min. for a concentration of the dispersion of about 12% by weight, 60° C. after 36 min. for a concentration of 24% by weight, 80° C. after 62 min. and 84° C. at the end of polymerization after 75 min. The final concentration is 40% by weight. The mechanical stability is low, but sufficient for the necessary manipulations. The tensile strength for a given elongation of 300% is high, namely 230 kg/cm². The finished products in the form of tubes or rolls are white, free of defects, and have good mechanical characteristics.

EXAMPLE 8

Example 6 is repeated, but the $C_8F_{17}SO_3Li$ emulsifier is used instead of the $C_7F_{15}COONH_4$ emulsifier, on a weight for weight basis. The initial temperature is 13° C., it reaches 40° C. after 24 min. for a concentration of the dispersion of 12% by weight, 60° C. after 48 min. for a concentration of about 25% by weight, 80° C. after 70 min. and 90° C. at the end of polymerization after 80 min. The final concentration is 40.5% by weight. The mechanical stability of this dispersion is exceptional (30 min.+30 min.+30 min.). The tensile strength at 300% elongation (TS 300%) is 195 kg/cm².

EXAMPLES 9 AND 10

These examples are given for the sake of comparison in order to show that if the polymerization is carried out at initial temperatures above 60° C.-70° C., even with a catalytic system which is active at that temperature, the stabilization effect, according to the invention, by elevation of the temperature is lacking.

For Example 9, the polymerization is carried out in an autoclave of the same type as the one used in the preceding tests and into which 20 liters of water and 11 g of ammonium perfluoroctanoate are introduced. After having brought the temperature of the medium up to 70° C., TFE is introduced until 22 bars of pressure are obtained, agitation is started, and 4 g of $(NH_4)_2S_2O_8$ are then introduced. Polymerization starts immediately and the monomer pressure is maintained between 20 and 22 bars as was done previously, while 69 g of $C_7F_{15}COONH_4$ are being introduced. The temperature of the medium is being kept at 70° C.±5° C. The polymerization stops for a concentration of 30%. The mechanical stability of the dispersion is low. The tensile strength for a given elongation of 300% is likewise low, namely 160 kg/cm².

For Example 10, the polymerization of Example 9 is repeated exactly, but the temperature of the reaction medium is made to follow an ascending curve: the temperature is 65° C. at the start, 70° C. are reached after 14 min., 80° C. after 32 min., 90° C. after 78 min. and 95° C. at the end of polymerization after 91 min. It is not possible to exceed a final concentration of 32% of the latex. The mechanical stability is low. The tensile strength at a given elongation of 300% is only 130 kg/cm². This example shows that if a polymerization started up at an elevated temperature is made to follow an ascending temperature curve, instead of a polymerization started up by an active system at a temperature below 45° C., then the result obtained is the opposite of the one advocated by the invention, namely a stabilization of the dispersion making it possible to obtain a concentration of 40% and over is not obtained and the molecular weight is lower instead of higher.

EXAMPLE 11

Example 2 is repeated, but the temperature of the reaction medium is kept constant at 20° C.±5° C. for 12 min., i.e. a concentration of the dispersion of about 18% of PTFE by weight, and then an ascending temperature curve is followed: the temperature is at 50° C. after 30 min., at 70° C. after 47 min. and at 78° C. at the end of polymerization after 57 min. The final concentration amounts to 40%, the mechanical stability of the latex is high, and the tensile strength at a given elongation of 300% is 215 kg/cm². The finished products in the form of tubes and rolls are white, free of defects, and have good mechanical characteristics.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. The process for the preparation of a polytetrafluoroethylene comprising polymerizing a tetrafluoroethylene in aqueous dispersion in the presence of an emulsifier and an initiator, and without a stabilizer, with the latter yielding free radicals between 0° and 45° C. and being destroyed for a temperature above 45° C., while regulating the temperature of the reaction medium as a function of polymerization time to follow an ascending curve, Temperature °C. versus t (time in minutes), whose slope $\Delta T/\Delta t$ cannot be less than 1/6, $\Delta T$ representing the temperature in °C. at a given time in minutes $\Delta t$, with this ascending curve being situated inside of a sector limited by two straight lines $y=7/12x$ and $y=15/7x+45$, in which y and x respectively represent the temperature in °C. and the time expressed in minutes; the initial polymerization temperature being between about 0° and 45° C.

2. The process of claim 1 wherein the ascending curve, Temperature °C.=t (time in minutes), is essentially a linear straight line for the major part of the polymerization, and the initiator is destroyed before the concentration in the dispersion of polytetrafluoroethylene has reached 20%.

3. The process of claim 2 wherein the ascending curve starts only after an initiation essentially level polymerization temperature period not exceeding 15 minutes.

4. The process of claim 3 wherein the ascending curve is essentially a linear straight line in the polymerization interval in which are formed from 200 g at the most of polytetrafluoroethylene per initial liter of water and 500 g at the least of polytetrafluoroethylene per initial liter at the end of polymerization.

5. The process of claim 2 wherein polymerization starts immediately according to the ascending curve, Temperature °C. versus t (time in minutes), with the ascending curve being essentially a linear straight line for at least ⅔ of the duration of polymerization.

6. The process of claim 5 wherein the ascending curve is essentially a linear straight line in the polymerization interval in which are formed from 30 g of polytetrafluoroethylene per initial liter of water to 500 g at the least per liter at the end of polymerization.

7. The process of claims 1, 2, 3, 4, 5, or 6 wherein the linearity of the theoretical straight line, Temperature °C. versus t (time in minutes), is such that for any point $T_iC.°$ the real value of the corresponding polymerization time $t_i$ is expressed to ±10 minutes and such that for any point $t_i$ the corresponding real temperature $T_iC.°$ is expressed to ±5° C.

8. The process of claims 1, 2, 3, 4, 5, or 6 wherein the initial polymerization temperature is between 0° and 45° C. and the final polymerization temperature is between 70° and 120° C.

* * * * *